: 3,634,309
FLUOROELASTOMER BONDED-SHEET PACKING AND METHOD OF MANUFACTURE
Henry Joseph Palumbo, Middlesex, N.J., assignor to Johns-Manville Corporation, New York, N.Y.
No Drawing. Continuation of application Ser. No. 506,283, Nov. 3, 1965. This application June 11, 1969, Ser. No. 832,442
Int. Cl. C08f 45/10
U.S. Cl. 260—41                                      3 Claims

ABSTRACT OF THE DISCLOSURE

Compressed packing material having exceptionally good stress relaxation properties and good chemical resistance at 300° to 600° F. is prepared from a mixture comprising asbestos fibers and a vinylidene fluoride and hexafluoropropylene copolymer. The packing material is particularly suited for maintaining a strong seal between metal surfaces that are subjected to relatively high operating temperatures.

BACKGROUND OF THE INVENTION

This application is a continuation of my copending application Ser. No. 506,283 filed Nov. 3, 1965, now abandoned.

For some time there has existed in the packing art a definite need for materials which would successfully resist impregnation by hydrocarbon materials such as oils and gasoline and likewise exhibit good chemical resistance and weathering properties over extended periods of use. Materials on the market composed of natural or synthetic rubbers have exhibited reasonably good chemical resistance, but, however, have exhibited poor stress relaxation properties at temperatures above 250° F. Desirably such materials should be elastic to the extent that they yield under deforming forces, but return to their original condition when the forces are relieved. The conventional elastomers become hard and brittle at temperatures above 250° F. Thus, while these materials yield to some extent to deforming forces, they have too great inherent stress relaxation to offer resistance to various forces applied so as to maintain a satisfactory seal or packing at the higher temperatures.

Certain materials which do exhibit good relaxation properties do not possess reasonable good chemical resistance and are soluable or swell in hydrocarbon oils or disintegrate when in contact with such oils or with water. Still other materials suffer deterioration in physical properties under changes in climatic conditions such as humidity variations.

BRIEF SUMMARY OF THE INVENTION

It is therefore an object of the present invention to provide a novel composition of matter which is resistant to the harmful effects of contact with chemicals, hydrocarbon materials and moisture, and exhibits good stress relaxation properties at temperatures above 250° F.

A further object of this invention is to provide a gasket material having these properties.

A further object of the invention is to provide the composition of matter which can be manufactured over reasonably extended variations in proportion and still exhibit the above desired properties.

Other objects and further applicability of this invention will become apparent from the description given hereinafter; it should be understood, however, that the detailed description, while indicating preferred embodiments of the invention, is given by way of illustration only, since various changes and modifications within the spirit and scope of the invention will become apparent to those skilled in the art from the detailed description.

DESCRIPTION OF THE PREFERRED EMBODIMENT

It has now been discovered that the foregoing objects may be satisfied and the disadvantages of the heretofore used asbestos reinforced compressed gasket materials overcome by providing a new composition of matter employing a fluoroelastomer and, specifically, a copolymer of vinylidene fluoride and hexafluoropropylene. Such a composition when combined with certain additives, including the asbestos fiber and filled and pressed to form a compressed sheet, provides a remarkable gasket material having exceptional stress relaxation properties at elevated temperatures and additionally having good chemical resistance.

The instant invention lies in the discovery that this particular elastomer, unlike any other elastomers which have been heretofore used, exhibits exceptional stress relaxation properties and this is completely surprising in view of the failure of all other elastomers which have been used for similar products.

The new fluoroelastomeric copolymer comprises from about 70% to 30% by weight of vinylidene fluoride and from about 30% to 70% by weight of hexafluoropropylene. This particular copolymer is prepared by copolymerizing about 50 to 60 parts by weight of vinylidene fluoride with about 40 to 85 parts by weight of hexafluoropropylene units. In preparing the bonded sheet packing, the fluoroelastomer may be used in an amount between 15% and 50% by weight of the total composition, and preferably between about 25% and 45%.

In the ordinary case, this invention may use normal asbestos fiber such as crysotile asbestos fiber. As used in the specification, however, the term asbestos is intended to include, in addition to crysotile fibers, other commercial varieties such as anthophyllite, actinolite, trimolite, crocidolite, amosite, various amphibole fibers and Canadian picrolite. Various grades may be used with the Quebec Asbestos Mining Association standards and the amount of asbestos used in the molded compound may vary between 30% and 70% by weight, with a preferred range of 35% to 45%.

Magnesium oxide or dibasis lead phosphate are used in nominal amounts between the range of 1% and 6% and preferably about 1% to 3% in order to pick up any fluorine which may be given off during the curing process. It is believed that the asbestos fiber itself, because of its high content of magnesium oxide, likewise functions similarly to some extent.

Any one of a variety of fillers may be used to complete the composition and these may include graphite, carbon black, silica sand, mica, diatomaceous silica, perlite, baryte, that is, barium sulfate, small amounts of other fibers and similar filler compositions. The range of these ingredients may vary between 10% and 50% and the amount should be dictated to some extent by the amount of asbestos fiber which is employed. Accordingly, it is desirable to have a significant amount of asbestos fiber and therefore the preferred range of filler lies between 10% and 20% by weight.

Various materials may be used as the curing agent and may be selected from the peroxides such as dicumyl peroxide, ditertiary butyl peroxide, and 2,4-dichlorobenzoyl peroxide, or the polyamines, such as dicinnamylidene hexamethylene diamine carbamate and ethylene diamine carbamate.

The invention is believed to be better understood by reference to the following examples wherein all parts are by weight unless otherwise specified.

In fabricating the fluoroelastomer bonded sheet packing, the elastomer of the type above described, and specifically Viton fluoroelastomer was creped by making two passes through a tight rubber mill. The creped material was diced, placed in a churn with equal proportions of a solvent such as methyl ethyl ketone and Solvesso petroleum solvent and coverted by churning over an extended period of time. The material was transferred to a sigma blade mixer and thereafter mixed for several minutes. The fillers, curative and well opened asbestos fibers were added slowly to the slurry and the mass worked until the fibers and other additives were completely coated with the compound and the composition became a plastic dough. The dough-like mass was placed between two rolls, one heated with steam which was the forming roll and the other conditioned with cold running water. Temperature of the hot roll ranged between 150° to 270° F. As the excessive solvent was volatilized from the surface of the dough adjacent to the hot surface of the roll, the coated fibers adhere to the surface of the hot roll forming a continuous sheet. The two rolls were separated slowly to increase the opening between them and allowed a continuous sheet to form. The forming operation was continued until a sheet of predetermined thickness was formed. The sheet was then cut from the roll and permitted to stand overnight. Thereafter it was press cured for approximately 15 minutes at about 90 p.s.i. using a pressure of 500 p.s.i. If a softer sheet is desired, the press cure operation can be eliminated.

The following three examples represent illustrative compositions prepared within the scope of this invention.

EXAMPLE I

|  | Percent |
|---|---|
| Viton fluoroelastomer copolymer | 16.63 |
| Magnesium oxide | 2.45 |
| Barytes (fine) | 16.63 |
| Carbon black | 2.71 |
| Dicinnamylidene | 0.57 |
| Asbestos fibers | 61.01 |
|  | 100.00 |

EXAMPLE II

|  | Percent |
|---|---|
| Viton fluoroelastomer copolymer | 22.35 |
| Magnesium oxide | 3.27 |
| Barytes (fine) | 22.35 |
| Carbon black | 3.66 |
| Silica sand | 4.00 |
| Dicinnamylidene | 0.73 |
| Asbestos fibers | 43.64 |
|  | 100.00 |

EXAMPLE III

|  | Percent |
|---|---|
| Viton fluoroelastomer copolymer | 39.67 |
| Magnesium oxide | 5.80 |
| Carbon black | 4.83 |
| Powdered graphite | 9.67 |
| Dicinnamylidene | 1.29 |
| Asbestos fibers | 38.74 |
|  | 100.00 |

The data below represents the advantages of using the elastic copolymers of vinylidene fluoride and hexafluoropropylene in comparison with a standard elastomeric compressed sheet. All products were asbestos reinforced products made on a sheeter with substantially the same ingredients except the change in elastomer.

In Table 1 a comparison was made with a styrene-butadiene elastomer packing considered to have the best stress relaxation properties of all the heretofore used elastomers. In each case a practical engine test was used on a head gasket for a Briggs and Stratton engine fastened by eight bolts having 150 in-pounds initial torque.

TABLE 1

|  | Example I |  | Styrene-butadiene elastomer |
|---|---|---|---|
| Initial thickness (inch) | 0.59 | 0.30 | 0.58 |
| Torque after 2 hours at 500° F., in. lb | 57 | 91 | 28 |
| Torque after 17 hours at 500° F.: |  |  |  |
| Cycle 1, in. lb | 74 | 79 |  |
| Cycle 2, in. lb | 73 | 84 |  |

This data clearly demonstrates the significant stress relaxation properties of the instant invention. As seen from the two-hour results the standard styrene-butadiene had all but lost its effectiveness as a gasket and accordingly was not considered for further testing. The fluoroelastomeric gasket however demonstrated good sealing after 2, 19, and 36 hours (with intervening cooling) at extended temperature conditions.

Table 2 below demonstrates the significant chemical and temperature resistance of the instant fluoroelastomeric packing with a neoprene-based packing considered to have the best resistance heretofore.

TABLE 2

|  |  | Example 1, 1/16 inch | Standard Neoprene, 1/16 inch |
|---|---|---|---|
| 1 | Normal tensile: |  |  |
|  | Longitudinal | 7,294 | 6,947 |
|  | Transverse | 2,396 | 3,366 |
|  | Average | 4,845 | 5,157 |
| 2 | SAE-ASTM compression, 1/4 in.-ft. 5000 p.s.i.: |  |  |
|  | Percent compression | 9.1 | 9.7 |
|  | Percent recovery | 59.7 | 63.8 |
| 3 | Weight per square yard: |  |  |
|  | Original thickness | 5.12 | 5.86 |
|  | Nominal thickness | 5.41 | 5.59 |
| 4 | Specific gravity | 2.12 | 2.02 |
| 5 | Versus turbo 15 (MIL-L-7808C) 70 hours at 300° F.: |  |  |
|  | a. Transverse tensile | 2,189 | 2,371 |
|  | b. Transverse tensile loss | 8.6 | 29.6 |
|  | c. Thickness increase | 1.8 | 16.9 |
|  | d. Percent volume swell | 16.6 | 24.0 |
|  | e. percent absorption | 1.5 | 14.6 |
| 6 | Versus Unvis J-43 fuel (MIL-O-5606) 70, hours at 300° F.: |  |  |
|  | a. Transverse tensile | 1,792 | 1,565 |
|  | b. Transverse tensile loss | 25.2 | 53.5 |
|  | c. Thickness increase | 3.0 | 29.3 |
|  | d. Percent volume swell | 19.6 | 42.5 |
|  | e. Percent absorption | 15.9 | 23.6 |
| 7 | Versus JP4 fuel, 70 hours at room temperature: |  |  |
|  | a. Transverse tensile | 1,780 | 1,829 |
|  | b. Transverse tensile loss | 25.7 | 45.7 |
|  | c. Thickness increase | Nil | 12.4 |
|  | d. Percent volume swell | 14.7 | 22.6 |
|  | e. Percent absorption | 13.1 | 12.4 |
| 8 | Versus C.P. benzene, 70 hours at room temperature: |  |  |
|  | a. Transverse tensile | 1,432 | 1,425 |
|  | b. Transverse tensile loss | 40.2 | 57.7 |
|  | c. Thickness increase | 2.2 | 36.4 |
|  | d. Percent volume swell | 25.3 | 56.4 |
|  | e. Percent absorption | 15.7 | 27.6 |
| 9 | Versus perchloroethylene, 70 hours at room temperature: |  |  |
|  | a. Transverse tensile | 1,709 | 1,738 |
|  | b. Transverse tensile loss | 28.7 | 48.4 |
|  | c. Thickness increase | Nil | 31.4 |
|  | d. Percent volume swell | 29.7 | 55.5 |
|  | e. Percent absorption | 32.5 | 51.5 |
| 10 | Versus carbon tetrachloride, 70 hours at room temperature: |  |  |
|  | a. Transverse tensile | 2,000 | 1,678 |
|  | b. Transverse tensile loss | 16.5 | 50.1 |
|  | c. Thickness increase | 1.0 | 31.2 |
|  | d. Percent volume swell | 23.6 | 55.8 |
|  | e. Percent absorption | 25.5 | 49.1 |

What I claim is:

1. A compressed packing material comprising between 15 and 50% by weight of a fluoroelastomer copolymer comprising from about 70 to 30% by weight vinylidene fluoride and from about 30 to 70% by weight hexafluoropropylene, between 30 and 70% by weight asbestos fibers, and the remainder filler material selected from the group consisting of barium sulfate, graphite, carbon black, silica, mica, diatomaceous silica and perlite.

2. A compressed packing material as defined in claim 1 wherein the fluoroelastomer is present in an amount between 25 and 45% by weight, the asbestos fiber is present in an amount between about 35 and 45% by weight, and the filler is present in an amount between about 10 and 20% by weight.

3. A compressed packing material as defined in claim 1 comprising between 15 and 50% by weight of fluoroelastomer copolymer, and 35 to 45% asbestos fibers, said copolymer consisting of 70 to 30% by weight of vinylidene fluoride and 30 to 70% by weight of hexafluoropropylene.

References Cited
UNITED STATES PATENTS

| | | | |
|---|---|---|---|
| 2,530,906 | 11/1950 | Palumbo | 260—37 |
| 3,090,775 | 5/1963 | Smith | 260—41 |
| 3,314,916 | 4/1967 | Cupery | 260—41 |
| 3,332,905 | 7/1967 | Teter | 260—41 |

MORRIS LIEBMAN, Primary Examiner

S. L. FOX, Assistant Examiner